United States Patent
Tsai et al.

(10) Patent No.: US 10,481,706 B2
(45) Date of Patent: Nov. 19, 2019

(54) TOUCH PANEL

(71) Applicant: TPK HOLDING CO., LTD., Grand Cayman (KY)

(72) Inventors: Di-Shing Tsai, Taichung (TW); Chia-Ching Lu, Taichung (TW); Jui-Wen Wu, Changhua County (TW); Ping-Wen Huang, Taichung (TW); Peng-Chih Yu, Taichung (TW); Su-Ming Lin, Taichung (TW)

(73) Assignee: TPK Holding Co., Ltd., Grand Cayman (KY)

( * ) Notice: Subject to any disclaimer, the term of this patent is extended or adjusted under 35 U.S.C. 154(b) by 0 days.

(21) Appl. No.: 13/650,146

(22) Filed: Oct. 12, 2012

(65) Prior Publication Data
US 2013/0093723 A1    Apr. 18, 2013

(30) Foreign Application Priority Data
Oct. 13, 2011 (TW) .............................. 100137100 A (51) Int. Cl.
*G06F 3/041* (2006.01)
(52) U.S. Cl.
CPC .................................. *G06F 3/041* (2013.01)
(58) Field of Classification Search
CPC ..................................................... G06F 3/041
USPC ..................... 345/173–184; 178/18.01–20.04
See application file for complete search history.

(56) References Cited

U.S. PATENT DOCUMENTS

| | | | | |
|---|---|---|---|---|
| 2008/0122796 A1* | 5/2008 | Jobs | .................... | G06F 3/0488 345/173 |
| 2010/0128002 A1* | 5/2010 | Stacy | .................... | G06F 3/016 345/174 |
| 2010/0222972 A1* | 9/2010 | Hustyi | .................... | F16H 59/02 701/53 |
| 2010/0253641 A1* | 10/2010 | Swedin | ............... | G02F 1/13338 345/173 |
| 2010/0328248 A1* | 12/2010 | Mozdzyn | .................... | 345/174 |
| 2011/0007011 A1* | 1/2011 | Mozdzyn | ................ | G06F 3/044 345/173 |
| 2011/0242039 A1* | 10/2011 | Kalis | .................... | G06F 1/1643 345/174 |

(Continued)

OTHER PUBLICATIONS

S.C. Liu, C.H. Chang, "new applications and development of touch panel and transparent conductive film materials", Industrial Materials Magazine, No. 255, Mar. 2008. p. 203, right column, line 7~p. 204, left column, line 2; p. 206, left column, line 18~p. 207, left column, line 23; Fig.4-5.

(Continued)

*Primary Examiner* — Vinh T Lam
(74) *Attorney, Agent, or Firm* — Cooper Legal Group, LLC (57) ABSTRACT

A touch panel including a touch region, a border region, a signal transmission device, and a light transmission pattern is provided. The border region is disposed on at least one side of the touch region. The signal transmission device is disposed in the border region. The light transmission pattern is disposed in the border region. The light transmission pattern partially overlaps the signal transmission device along a vertical projection direction. The signal transmission device includes at least one transparent conducting line. The transparent conducting line overlaps partial the light transmission pattern in the vertical projection direction.

13 Claims, 8 Drawing Sheets

(56) References Cited

U.S. PATENT DOCUMENTS

| | | | | |
|---|---|---|---|---|
| 2011/0248938 A1* | 10/2011 | Kwak | ................... | G06F 3/044 345/173 |
| 2011/0279394 A1* | 11/2011 | Kim | ................... | G06F 1/1626 345/173 |
| 2011/0298725 A1* | 12/2011 | Yeh | ................... | G06F 3/044 345/173 |
| 2011/0298747 A1* | 12/2011 | Kim | ................... | G06F 3/044 345/174 |
| 2012/0139848 A1* | 6/2012 | Lee | ................... | G06F 3/044 345/173 |
| 2012/0249467 A1* | 10/2012 | Kotala | ............... | A47L 15/4293 345/174 |
| 2013/0044058 A1* | 2/2013 | Sciulli et al. | ............... | 345/168 |
| 2013/0044075 A1* | 2/2013 | Utsugi | ............... | G06F 3/0219 345/174 |
| 2014/0292701 A1* | 10/2014 | Christiansson et al. | ...... | 345/173 |

OTHER PUBLICATIONS

"MOTO_ATRIX dual-core mobile phone excellent for business and entertainment", SOGI king, Jun. 22, 2011, lower part of p. 5, http://www.sogi.com.tw/mobile/articles/6167440-MOTO+ATRIX%E9%9B%99%E6%A0%B8%E6%89%8B%E6%A9%9F+%E5%95%86%E5%8B%99%E5%A8%9B%E6%A8%82%E4%B8%80%E6%8A%8A%E7%BD%A9.

\* cited by examiner

TOUCH PANEL

BACKGROUND OF THE INVENTION

1. Field of the Invention

The present invention relates to a touch panel, and more particularly, to a touch panel with overlapped conducting lines and light transmission patterns in the border region.

2. Description of the Prior Art

Touch panels have been widely used in the input interfaces of instruments for their properties, like the diversity of designs and the human/machine interactions possibilities. In recent years, more and more consumer electronics, such as mobile phones, GPS navigator systems, tablet computers and laptop computers, comprise touch display panels. In the consumer electronics product mentioned above, except for the main touch region of the touch panels, the border region of the touch panels may also be used for other functions. For example, the border region may be used for disposing decorative patterns (ex. special symbols or logos) and indicative patterns for operational status (ex. the operational status of Bluetooth, WiFi wireless networking, or 3G functions). Those patterns are generally highlighted by using a light source under the touch panel. However, since the border region in conventional touch panel is generally occupied by numerous opaque metal conducting lines, the locating of the light transmission patterns has to avoid the region occupied by the opaque metal conducting lines. The variability of designs of light transmission pattern is therefore limited. For a slim border design, it becomes even more difficult to dispose light transmission patterns without overlapping the opaque metal conducting lines.

SUMMARY OF THE INVENTION

The main purpose of the present invention is to provide a touch panel featuring a design that replaces parts of the opaque conducting lines with transparent conducting lines in the border region of signal transmission device, so that the light transmission pattern in the border region is able to partially overlap the signal transmission device, thereby improving the variability in designs of light transmission patterns.

For the above-mentioned purpose, a touch panel is provided in one preferred embodiment of present invention comprising a touch region, a border region disposed on at least one side of the touch region, a signal transmission device disposed in the border region, and a light transmission pattern disposed in the border region and being partially overlapping the signal transmission device in a vertical projection direction, wherein the signal transmission device comprises at least one transparent conducting line overlapping partial the light transmission pattern in the vertical projection direction.

For the above-mentioned purpose, a touch panel is provided in another preferred embodiment of present invention comprising a touch region, a border region disposed on at least one side of the touch region, a signal transmission device disposed in the border region, and a light transmission pattern disposed in the border region and being partially overlapping the signal transmission device in a vertical projection direction, and at least one transparent dummy line, wherein the signal transmission device comprises at least one transparent conducting line partially overlapping the light transmission pattern in the vertical projection direction. The transparent dummy line is disposed in the border region and partially overlaps the light transmission pattern in the vertical projection direction.

The present invention features a design that replaces parts of the opaque conducting lines in the signal transmission device with transparent conducting lines in the border region of the touch panel, so that the design of the light transmission pattern may not be limited by the opaque conducting lines when the light transmission pattern in the border region is partially overlapping the signal transmission device, thereby improving the variability of designs for light transmission patterns in the border region. Furthermore, the uniformity of transparency of overall light transmission patterns may be improved by the method overlapping the transparent dummy lines and light transmission patterns.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The accompanying drawings are included to provide a further understanding of the embodiments, and are incorporated in and constitute apart of this specification. The drawings illustrate some of the embodiments and, together with the description, serve to explain their principles. In the drawings.

It should be noted that all the figures are diagrammatic. Relative dimensions and proportions of parts of the drawings have been shown exaggerated or reduced in size, for the sake of clarity and convenience in the drawings. The same reference signs are generally used to refer to corresponding or similar features in modified and different embodiments.

DETAILED DESCRIPTION

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare the embodiments between each others, identical components are marked with the same reference numerals in each of the following embodiments. Additionally, the terms like "first" and "second" in this context are only used to distinguish different components and do not constrain the order of generation.

Figure 1:
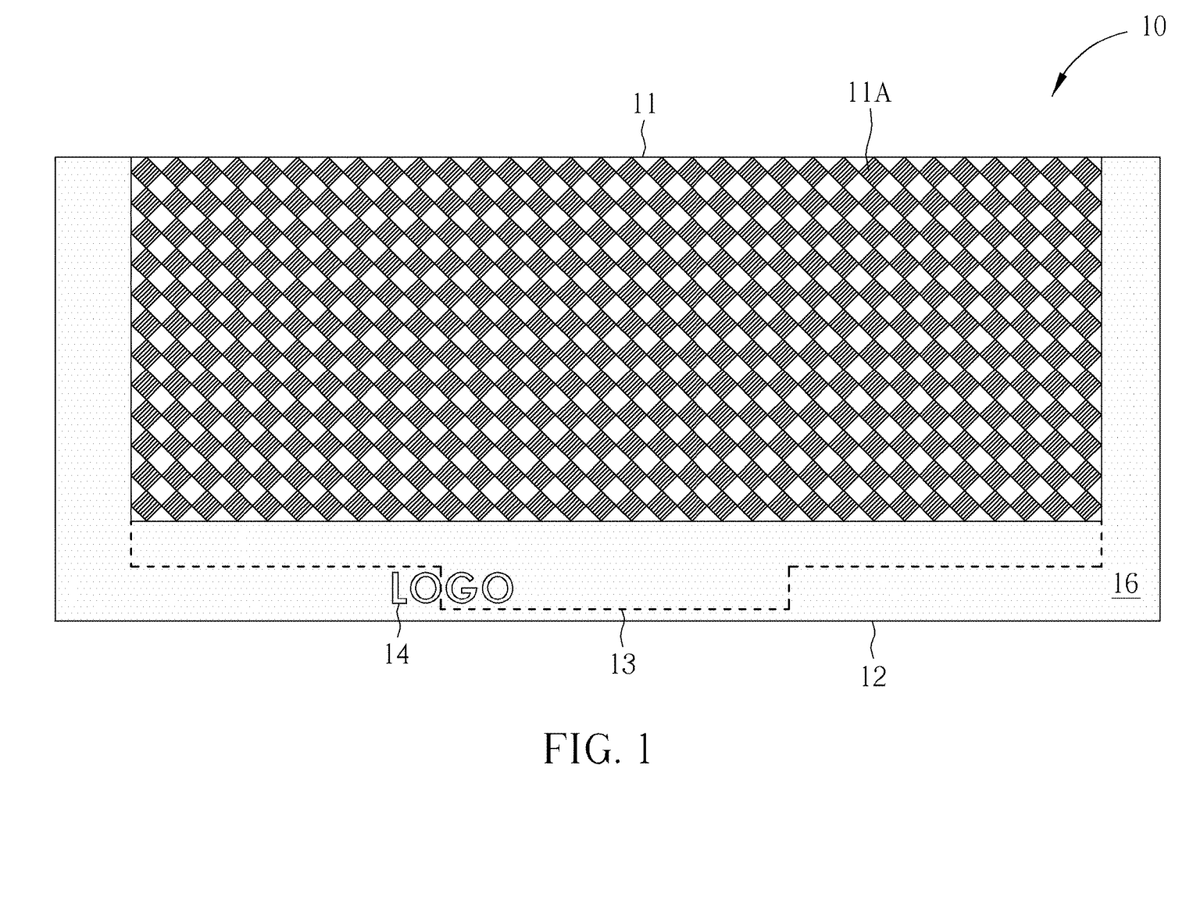
FIG. 1 is a top view illustrating a touch panel in one preferred embodiment of the present invention.
Figure 2:
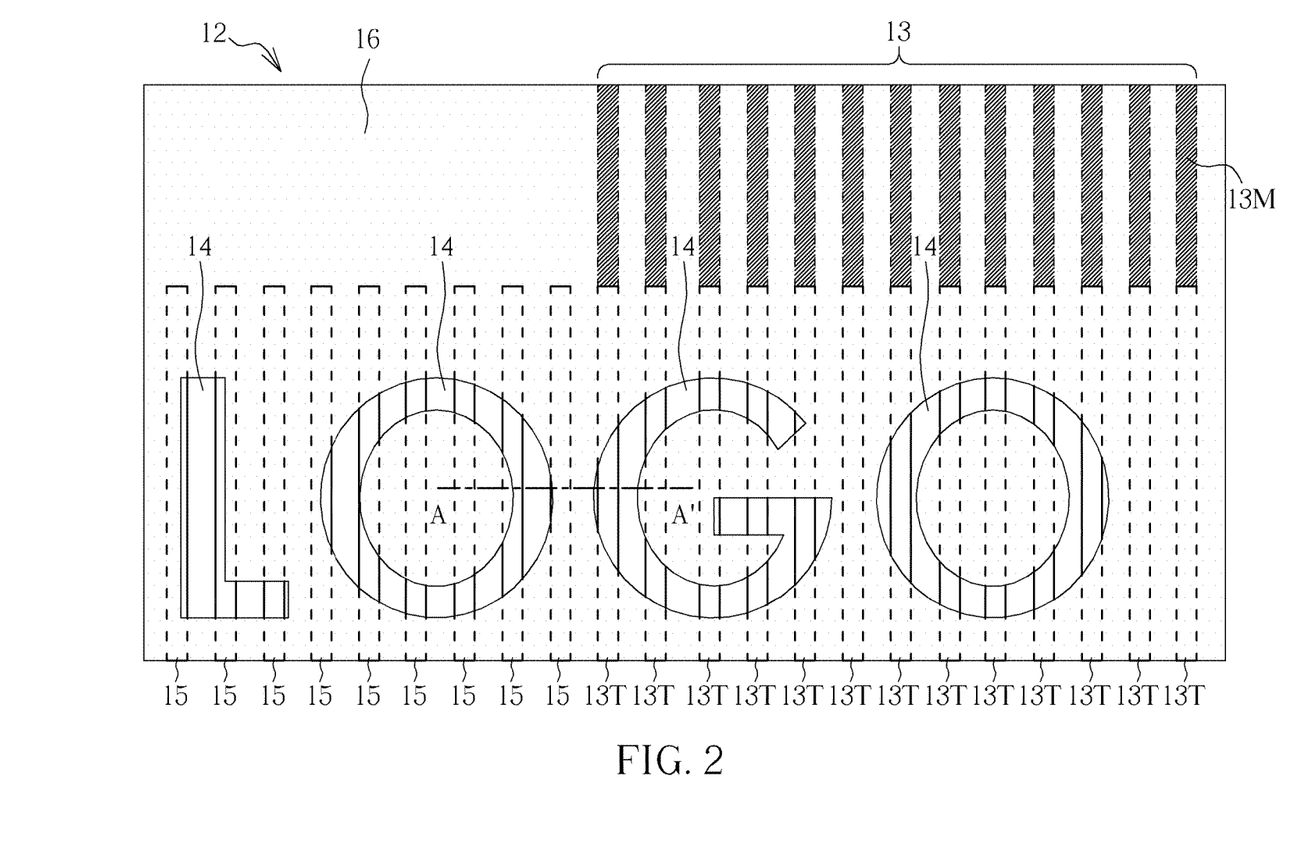
FIG. 2 is a local, enlarged top view illustrating a border region of the touch panel in one preferred embodiment of the present invention.
Figure 3:
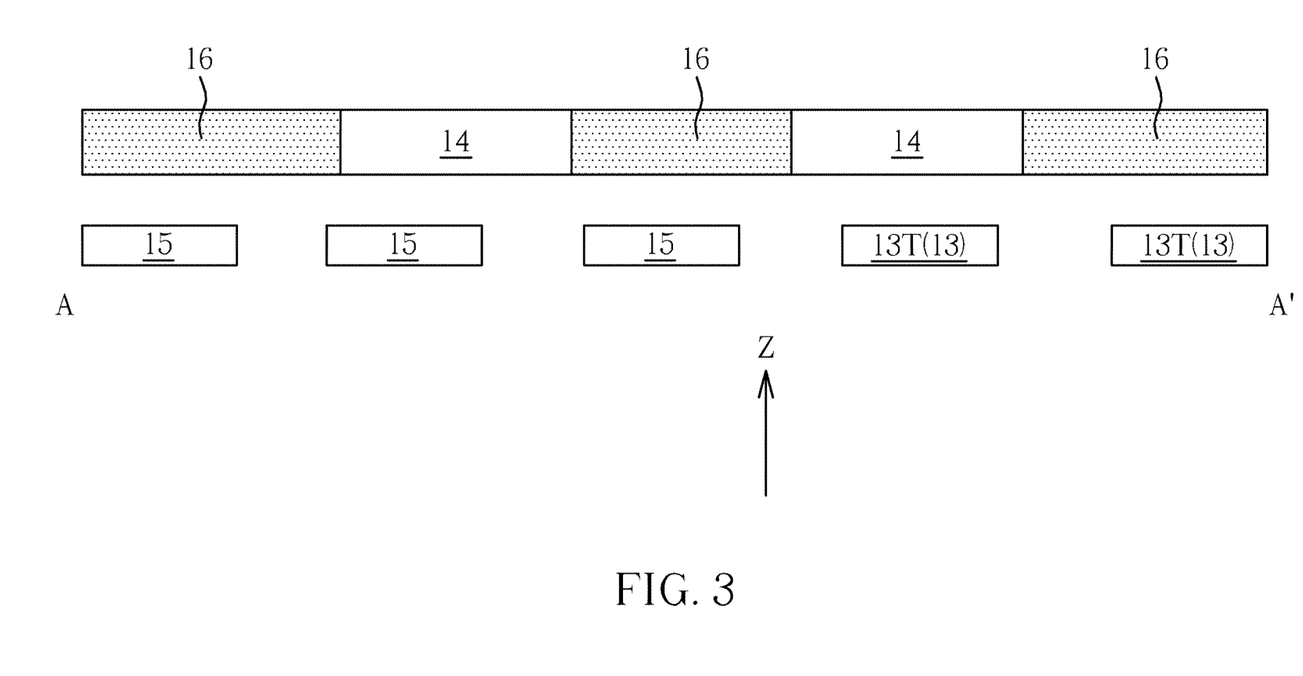
FIG. 3 is a side view of the border region of the touch panel taken along the line A-A' in FIG. 2 in one preferred embodiment of the present invention.

Please refer to FIGS. 1-3. FIG. 1 is a top view illustrating a touch panel in one preferred embodiment of the present invention. FIG. 2 is a local, enlarged top view illustrating a border region of the touch panel in one preferred embodiment of the present invention. FIG. 3 is a side view of the border region of the touch panel taken along the line A-A' in FIG. 2 in one preferred embodiment of the present invention. For easier description, the drawings of the present invention are merely descriptive and are included to provide a better understanding for the reader, therefore the scale of the components in the drawings may be modified depending on the design requirements.

As shown in FIGS. 1-3, a touch panel 10 is provided in one preferred embodiment of the present invention. The Touch panel 10 is composed of a touch region 11, a border region 12, a signal transmission device 13, a decorative layer 16 and a light transmission pattern 14. The touch panel in present invention may include, but is not limited to, a capacitive touch panel, a resistive touch panel or an optical touch panel. The border region 12 is disposed on at least one side of the touch region 11. The signal transmission device 13 is disposed in the border region 12. The light transmission pattern 14 is disposed in the border region 12 and partially overlapped by the signal transmission device 13 along one vertical projection direction Z. The decorative layer 16 is disposed in the border region 12. In the present invention, the light transmission pattern 14 may include, but is not limited to, a decorative pattern, such as a Bluetooth logo or a WiFi wireless networking logo. The signal transmission device 13 includes at least one transparent conducting line 13T partially overlapping the light transmission pattern 14 along the vertical projection direction Z. In other words, since the signal transmission device 13 in the present invention is provided with transparent conducting line 13T, the light transmission pattern 14 may partially or completely overlap the transparent conducting line 13T of the signal transmission device 13. This way, the border region 12 of the touch panel 10 can be fully utilized even in a slim border design. Furthermore, as shown in FIG. 1, the touch panel 10 in the present invention may further comprise, but not be limited to, a plurality of touch units 11A disposed in the touch region 11 and selectively disposed in partial border region 12 and electrically connected to the signal transmission device 13. As shown in FIG. 2, the signal transmission device 13 may further include a plurality of opaque conducting lines 13M. Each transparent conducting line 13T is electrically connected to at least one opaque conducting line 13M, but is not limited thereto. For example, the signal transmission device 13 may be composed of only a plurality of transparent conducting lines 13T. Please note that the opaque conducting lines 13M in the present invention may be various conducting lines made of opaque materials including, but not limited to, metal conducting lines, printing silver paste or carbon paste. Additionally, the resistivity of the opaque conducting lines 13M in the present invention is substantially lower than that of the transparent conducting lines 13T, thus the use of opaque conducting lines 13M may reduce the impedance of the signal transmission device 13. It should be noted that, as shown in FIG. 2, each opaque conducting line 13M of the signal transmission device 13 may be electrically connected, but is not limited, to the transparent conducting line 13T of the same length in order to achieve the benefit of equal resistance for each conducting line in the signal transmission device 13. The width and length of each transparent conducting line 13T may be adjusted, depending on the design requirements. For example, the width and length of a transparent conducting line 13T may be adjusted so that only parts of the corresponding opaque conducting line 13M are electrically connected to the transparent conducting line 13T in order to prevent signal errors resulting from deviations between the impedances of the conducting lines 13T.

Furthermore, as shown in FIGS. 1-3, the touch panel 10 of the present invention may further include at least one transparent dummy line 15 disposed in the border region 12. The transparent dummy line 15 overlaps the partial light transmission pattern 14 along the vertical projection direction Z. In other words, since only parts of the light transmission pattern 14 overlap the transparent conducting line 13T of the signal transmission device 13, the region of the light transmission pattern 14 being not overlapped by the signal transmission device 13 may partially overlap the transparent dummy line 15, thereby improving the uniformity of transparency of the overall light transmission pattern 14. The variety of designs for the light transmission pattern 14 may also be increased, thereby reducing the development time of the product. In this embodiment, the transparent conducting line 13T and the transparent dummy line 15 may be made, but not limited to, of the same patterned transparent conducting layer. The material of the patterned transparent conducting layer may be indium tin oxide (ITO), indium zinc oxide (IZO), aluminum zinc oxide (AZO), or other adequate transparent conducting materials. Additionally, the transparent dummy line 15 in the present invention is, but not limited thereto, electrically isolated from the signal transmission device 13.

The following description will detail the different embodiments of the touch panel of the present invention. To simplify the description, identical components in each of the following embodiments are marked with identical symbols. For easier comparison of the difference between the embodiments, the following description will detail the dissimilarities between the different embodiments and the identical features will not be redundantly described.

Figure 4:
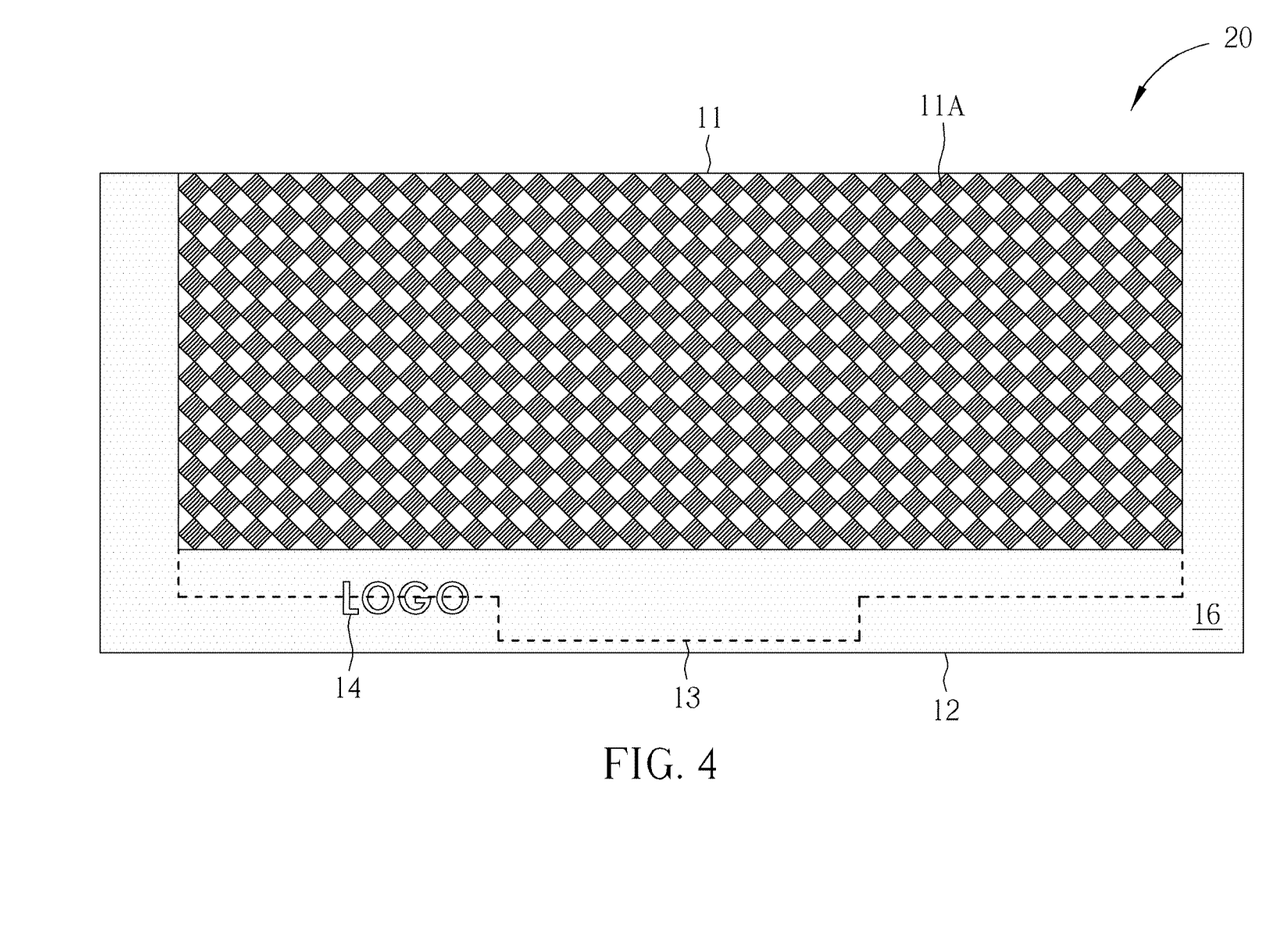
FIG. 4 is a top view of a touch panel in another preferred embodiment of the present invention.
Figure 5A:
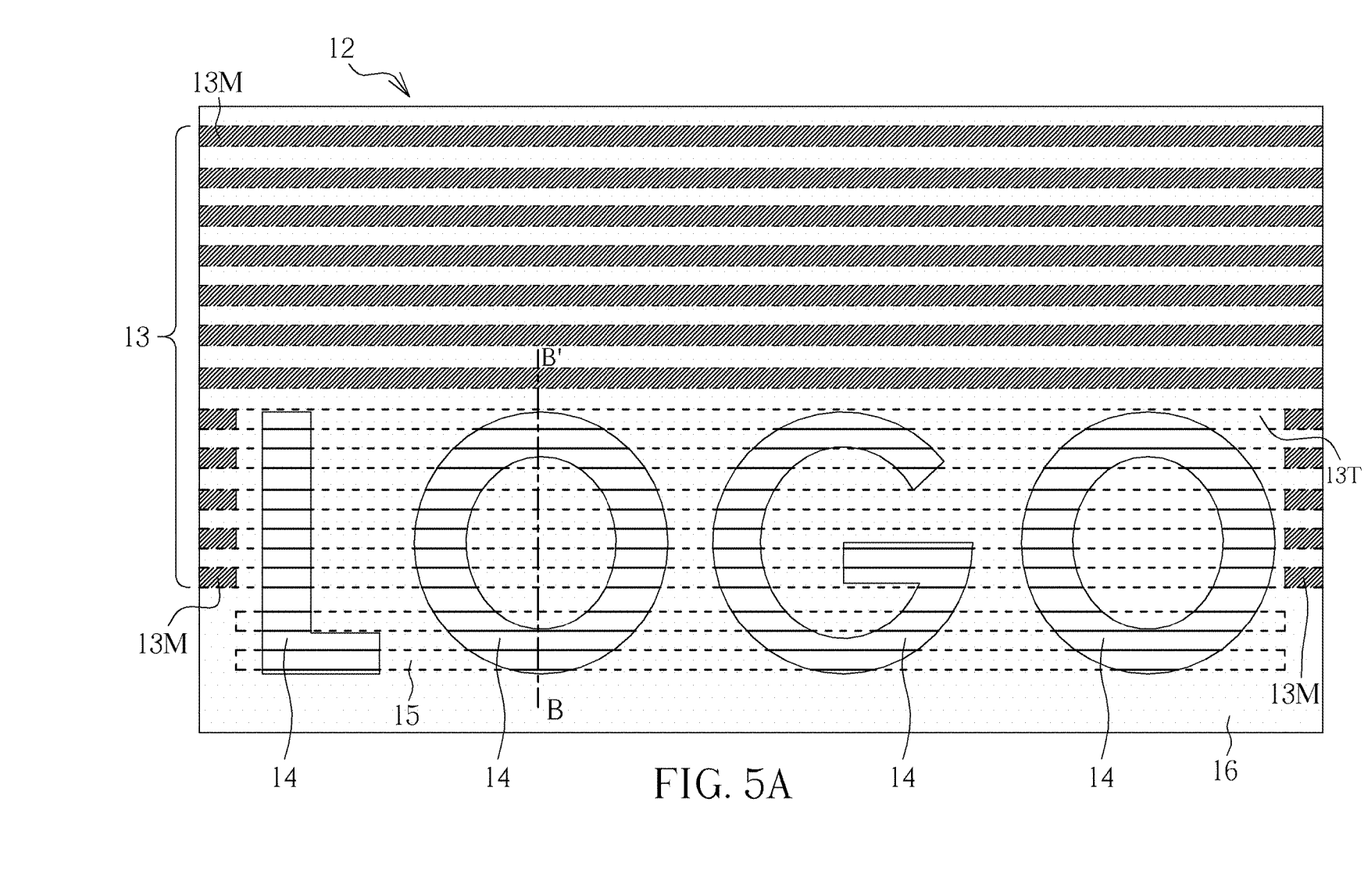
FIGS. 5A and 5B are schematic views of a first preferred embodiment for the border region of the touch panel in FIG. 4.
Figure 5B:
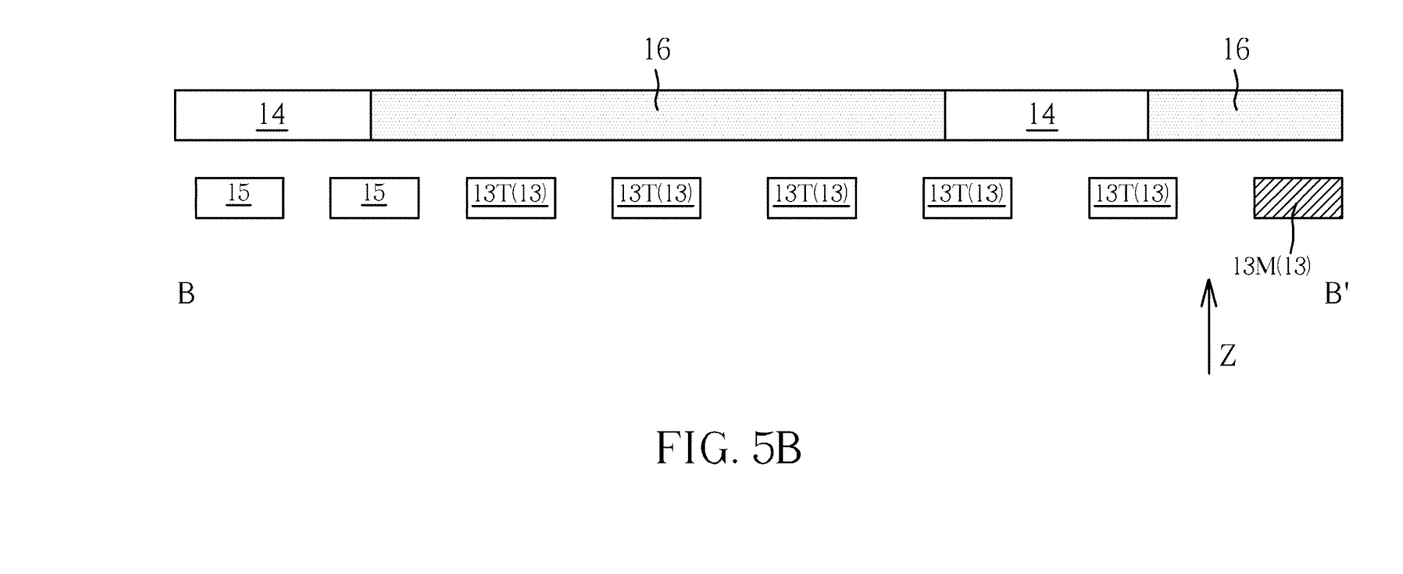
Figure 6A:
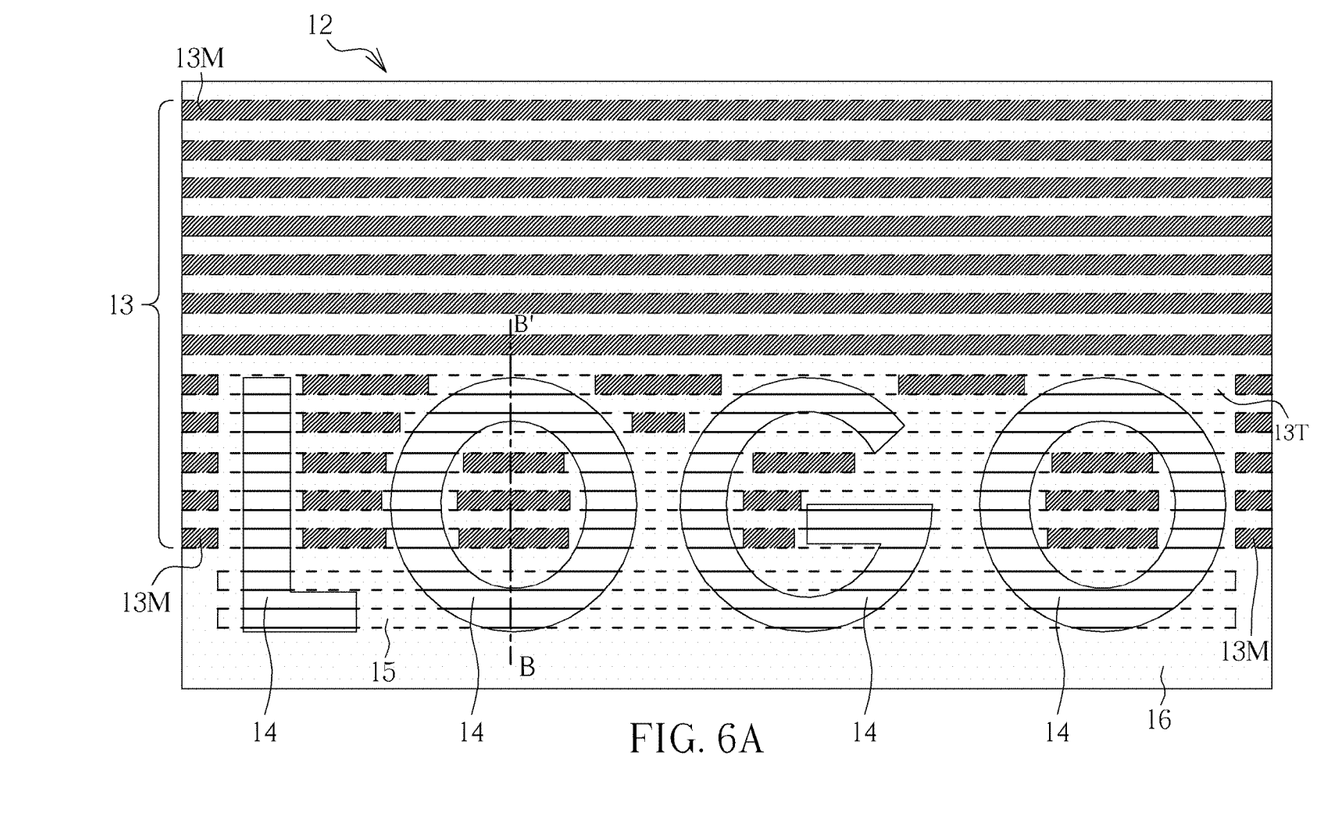
FIGS. 6A and 6B are schematic views of a second preferred embodiment for the border region of the touch panel in FIG. 4
Figure 6B:
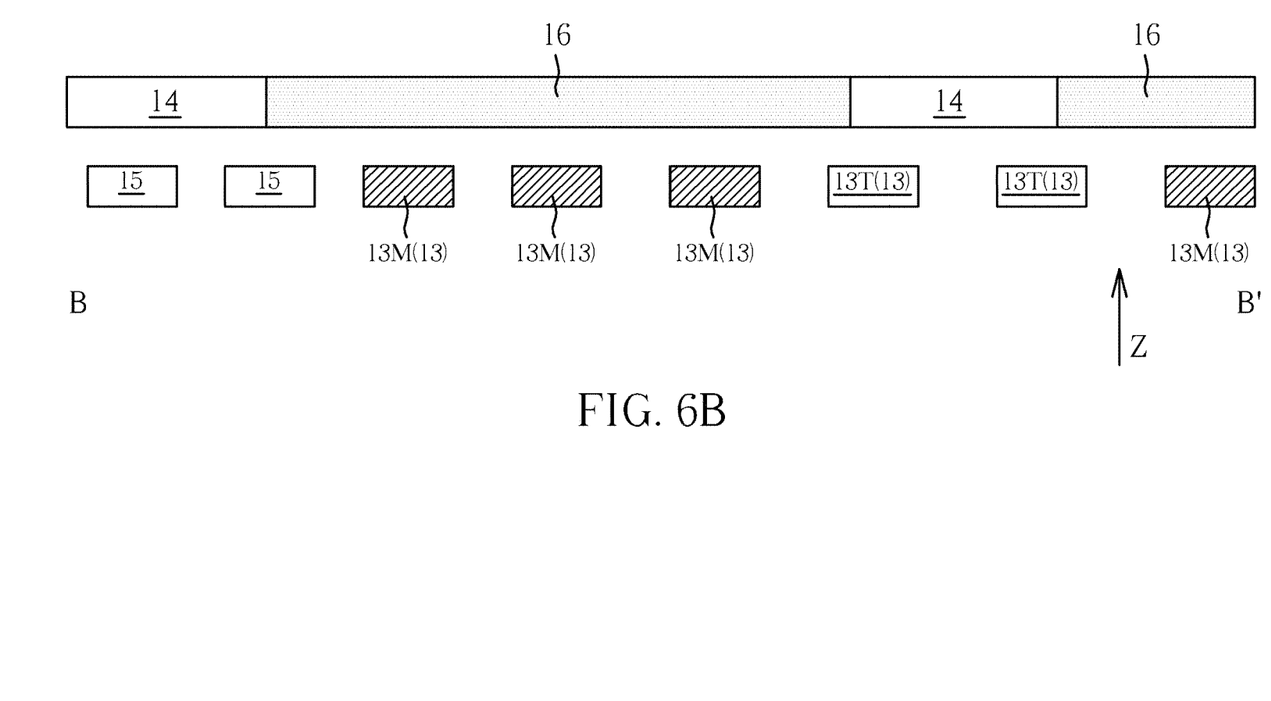

Please refer to FIG. 4, FIG. 5A, FIG. 5B, FIG. 6A and FIG. 6B. FIG. 4 is a top view of a touch panel in another preferred embodiment of the present invention. FIGS. 5A and 5B are schematic views of a first preferred embodiment for the border region of the touch panel in FIG. 4, wherein FIG. 5A is a local, enlarged view of a border region of the touch panel, and FIG. 5B is a side view taken along the line B-B' in FIG. 5A. FIGS. 6A and 6B are schematic views of a second preferred embodiment for the border region of the touch panel in FIG. 4, wherein FIG. 6A is a local, enlarged view of a border region of the touch panel, and FIG. 6B is a side view taken along the line B-B' in FIG. 6A. In this embodiment, as shown in FIGS. 4, 5A, and 5B, the touch panel 20 includes a touch region 11, a border region 12, a signal transmission device 13 and a light transmission pattern 14. It should be noted that the first preferred embodiment of border 12 and the foregoing embodiment are different in the aspect that both ends of each transparent conducting line 13T of the signal transmission device 13 in the first preferred embodiment are electrically connected respectively to the opaque conducting line 13M, thereby further reducing the impact of the transparent conducting line 13T on the resistivity of the signal transmission device 13. Therefore, as shown in FIG. 5A, the portion of the signal transmission device 13 being not overlapped by the light transmission pattern 14 may be made mostly by opaque conducting line 13M in order to reduce the impact of the transparent conducting line 13T on the resistivity. In the second preferred embodiment of the border region 12, as shown in FIGS. 6A and 6B, the signal transmission device 13 may include a plurality of transparent conducting lines 13T with different lengths. The position of the transparent conducting lines 13T with different lengths may be adjusted considering the changes in the detailed light transmission pattern 14 to further reduce the impact of the transparent conducting lines 13T on the entire signal transmission device 13. Besides, the transparent dummy lines 15 may also have different lengths to accommodate to any kind of process condition. The parts and material properties in the present embodiment are substantially the same as the ones in the foregoing embodiment. Unnecessary details are omitted herein.

In conclusion, the touch panel of the present invention features transparent conducting lines disposed on the border region, so that the variety of designs for the light transmission pattern in the border region may be increased. Also, the uniformity of transparency of the overall light transmission pattern may be improved by the design of the transparent dummy line.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A touch panel, comprising:
a touch region;
a border region disposed outside said touch region;
a signal transmission device disposed in said border region, said signal transmission device comprising at least one heterogeneous conducting line outside said touch region; and
a light transmission pattern disposed in said border region and partially overlapping said signal transmission device along a vertical projection direction;
wherein said heterogeneous conducting line comprises at least one transparent conducting line overlapping partial said light transmission pattern along said vertical projection direction, said heterogeneous conducting line further comprises at least one opaque conducting line, said transparent conducting lines are electrically connected to said opaque conducting line, and said heterogeneous conducting line does not generate a touch signal by itself.

2. The touch panel of claim 1, further comprising a plurality touch units disposed in said touch region and partial said border region, wherein said signal transmission device is electrically connected to said touch units.

3. The touch panel of claim 1, wherein said opaque conducting line comprises metal conducting lines, printing silver paste or printing carbon paste.

4. The touch panel of claim 1, further comprising a transparent dummy line disposed in said border region and overlapping partial said light transmission pattern along said vertical projection direction.

5. The touch panel of claim 4, wherein said transparent dummy line is electrically isolated from said signal transmission device.

6. The touch panel of claim 4, wherein said transparent conducting line and said transparent dummy line are made of a patterned transparent conducting layer.

7. The touch panel of claim 6, wherein a material of said patterned transparent conducting layer comprises indium tin oxide (ITO), indium zinc oxide (IZO) or aluminum zinc oxide (AZO).

8. The touch panel of claim 1, wherein said light transmission pattern is a function indicating pattern.

9. The touch panel of claim 1, wherein said light transmission pattern is a logo.

10. The touch panel of claim 1, wherein said light transmission pattern comprises a decorative pattern.

11. The touch panel of claim 10, wherein said decorative pattern is a Bluetooth logo or a WIFI wireless logo.

12. The touch panel of claim 1, wherein the resistivity of said opaque conducting line is substantially lower than that of said transparent conducting lines for reducing the impedance of said signal transmission device.

13. The touch panel of claim 1, wherein said opaque conducting line is electronically connected said transparent conducting line of same length for achieving equal resistance.

* * * * *